United States Patent
Bret

(10) Patent No.: US 10,787,066 B2
(45) Date of Patent: Sep. 29, 2020

(54) VEHICLE OPENING PART WITH A PROJECTING TRIM ELEMENT

(71) Applicant: Flex-N-Gate France, Audincourt (FR)

(72) Inventor: Sébastien Bret, Brebotte (FR)

(73) Assignee: Flex-N-Gate France, Audincourt (FR)

( * ) Notice: Subject to any disclaimer, the term of this patent is extended or adjusted under 35 U.S.C. 154(b) by 46 days.

(21) Appl. No.: 16/213,009

(22) Filed: Dec. 7, 2018

(65) Prior Publication Data
US 2019/0176593 A1    Jun. 13, 2019

(30) Foreign Application Priority Data

Dec. 8, 2017   (FR) ...................... 17 61858

(51) Int. Cl.
| | |
|---|---|
| *B60J 5/10* | (2006.01) |
| *B60J 1/20* | (2006.01) |
| *B60R 13/04* | (2006.01) |
| *B60Q 1/44* | (2006.01) |
| *B60Q 1/26* | (2006.01) |
| *B62D 35/00* | (2006.01) |

(52) U.S. Cl.
CPC ............ *B60J 5/101* (2013.01); *B60J 1/20* (2013.01); *B60J 5/107* (2013.01); *B60Q 1/2619* (2013.01); *B60Q 1/44* (2013.01); *B60R 13/04* (2013.01); *B62D 35/007* (2013.01)

(58) Field of Classification Search
CPC ... B60J 1/20; B60J 1/2002; B60J 3/002; B60J 7/101; B60J 7/107; B60J 5/101; B60J 5/107; B62D 35/007; B60R 13/04; B60Q 1/44

USPC .................. 296/146.8, 106, 180.1, 95.1
See application file for complete search history.

(56) References Cited

U.S. PATENT DOCUMENTS

| | | | |
|---|---|---|---|
| 8,419,099 B2 * | 4/2013 | Inoue ................... | B62D 35/007 296/1.08 |
| 8,523,269 B2 * | 9/2013 | Igura ...................... | B60J 5/101 296/146.8 |

(Continued)

FOREIGN PATENT DOCUMENTS

| | | |
|---|---|---|
| DE | 102012102442 A1 | 9/2013 |
| DE | 202013105651 U1 | 3/2015 |

(Continued)

OTHER PUBLICATIONS

Preliminary Search Report dated Mar. 9, 2018 during the prosecution of French Patent Application No. 1761858.

*Primary Examiner* — Dennis H Pedder
(74) *Attorney, Agent, or Firm* — Troutman Pepper Hamilton Sanders LLP

(57) ABSTRACT

The vehicle opening part comprise a main body defining an opening closed by a window, attached on at least one upper edge of said opening and being formed on an upper branch of said body, said upper branch further comprising a cavity open toward the outside of the body. The opening part further comprises a first trim element attached on the upper branch and comprising a projecting part projecting from the upper branch, such that a functional space extends between said window and said projecting part. The opening part comprises a second trim element closing said functional space and being attached to the body exclusively by at least one fastening element extending in the functional space between said first trim element and said window.

10 Claims, 3 Drawing Sheets

(56) References Cited

U.S. PATENT DOCUMENTS

| | | | |
|---|---|---|---|
| 9,902,437 B2 * | 2/2018 | Demange | B62D 29/04 |
| 10,272,750 B2 * | 4/2019 | Costa | B62D 35/007 |
| 10,308,293 B2 * | 6/2019 | Khayat | B62D 35/007 |
| 10,377,429 B2 * | 8/2019 | Leterrier | B62D 27/06 |
| 2006/0108830 A1 | 5/2006 | Ordonio, Jr. et al. | |
| 2007/0200389 A1 * | 8/2007 | Ina | B60J 5/101 |
| | | | 296/180.1 |
| 2008/0301898 A1 * | 12/2008 | Katou | B62D 35/007 |
| | | | 15/250.201 |
| 2011/0241376 A1 * | 10/2011 | Igura | B60J 5/101 |
| | | | 296/146.3 |
| 2013/0020822 A1 * | 1/2013 | Inoue | B62D 35/007 |
| | | | 296/1.08 |
| 2014/0367992 A1 * | 12/2014 | Brandscheid | B62D 35/00 |
| | | | 296/180.1 |
| 2015/0291232 A1 * | 10/2015 | Watanabe | B60J 5/101 |
| | | | 296/180.1 |
| 2016/0221614 A1 * | 8/2016 | Demange | B62D 29/04 |
| 2017/0282981 A1 * | 10/2017 | Leterrier | B62D 27/06 |
| 2017/0361689 A1 * | 12/2017 | Costa | B60S 1/043 |
| 2018/0037277 A1 * | 2/2018 | Khayat | B62D 35/007 |
| 2018/0251101 A1 * | 9/2018 | Inamura | B60S 1/52 |
| 2018/0251166 A1 * | 9/2018 | Escoffier | B62D 35/007 |
| 2018/0312204 A1 * | 11/2018 | Schellekens | B60Q 1/302 |

FOREIGN PATENT DOCUMENTS

| | | | | |
|---|---|---|---|---|
| EP | 2620355 A1 | 8/2011 | | |
| FR | 3029164 A1 | 6/2016 | | |
| GB | 2501812 A * | 11/2013 | | B62D 37/02 |

* cited by examiner

VEHICLE OPENING PART WITH A PROJECTING TRIM ELEMENT

CROSS-REFERENCE TO RELATED APPLICATIONS

The present patent application claims priority from French Patent Application No. FR 17 61858, filed on Dec. 8, 2017. The entire contents of which are incorporated by reference in their entirety.

FIELD OF THE INVENTION

The present invention relates to a vehicle opening part, comprising a main body defining an opening closed by a window, attached on at least one upper edge of said opening, said upper edge being formed on an upper branch of said body, said upper branch further comprising a cavity open toward the outside of the body, the opening part further comprising a first trim element attached on the upper branch so as to hermetically close said cavity, the first trim element comprising a projecting part projecting from the upper branch across from the window, such that a functional space extends between said window and said projecting part.

The invention also relates to a method for assembling such an opening part.

BACKGROUND

The invention for example applies to a vehicle tailgate closing the access to the rear storage space of the vehicle, the first trim element forming a spoiler giving a particular appearance to the upper part of the tailgate while projecting from the upper part of the tailgate.

Such a spoiler is generally formed by a part attached on the finished tailgate in which the rear bezel is already attached on the body of the tailgate and the sealing of which is provided by a skin attached on the body of the tailgate. However, such a solution is particularly costly, since it requires adding an additional part on a traditional finished tailgate.

Document FR-3,029,164 describes a vehicle opening part on which the spoiler is integrated into the tailgate and made in two parts, one being attached on the body of the tailgate before attaching the window and the other covering the upper edge of the window and being attached on the body of the tailgate after attaching the window.

However, the second part is attached on the body of the tailgate by an attachment element passing through the body of the tailgate from the inside to the outside, which complicates the method for assembling the tailgate by requiring an operator to position the second part from the outside of the tailgate and to see to the fastening from the inside in a relatively inaccessible zone. Furthermore, such attachment can raise sealing problems, since an orifice passing through the body of the tailgate between the inside and the outside must be provided for the passage of the fixing element.

SUMMARY

One aim of the invention is to offset these drawbacks by proposing a vehicle opening part able to be assembled simply, while providing reliable sealing of the opening part.

To that end, the invention relates to a vehicle opening part of the aforementioned type, further comprising a second trim element closing said functional space, said second trim element being attached to the body exclusively by at least one fastening element extending in the functional space between said first trim element and said window.

By attaching the second trim element via a fastening element passing through the space extending between the first trim element and the window, the attachment of the second trim element is done only from the outside of the tailgate and does not require access to the inside of the tailgate. Furthermore, such attachment does not require an opening extending from the inside to the outside of the opening part, which improves the sealing thereof.

According to other optional features of the vehicle opening part, considered alone or according to any technically possible combination:

- the second trim element is attached to the body via an interface part, attached to the body between the upper edge and the first trim element and extending in the functional space, said interface part comprising at least one orifice for receiving the fastening element of the second trim element;
- the interface part comprises a support branch extending across from the projecting part of the first trim element, said projecting part being attached on said support branch;
- the second trim element comprises a free end flush with the free end of the projecting part of the first trim element, said free ends forming a pointed edge extending across from the window;
- at least one optical element is attached in a housing formed in the second trim element;
- the optical element is connected to a current source by at least one electric cable, said cable passing through an orifice formed in the bottom of the housing, said orifice being connected sealably to an opening emerging in the cavity of the body, such that the electric cable passes in said cavity of the body;
- the first trim element is glued on the upper branch of the body;
- the first trim element and the second trim element have a different appearance from one another.

The invention also relates to a method for assembling a vehicle opening element as described above, comprising the following successive steps:
- attaching the first trim element on the upper branch of the body,
- placing the window over the opening and attaching the window on the upper edge of the opening,
- closing the functional space between the window and the projecting part of the first trim element using the second trim element, the attachment of said second trim element being done only in said functional space.

According to another optional feature of the assembly method, the interface part is attached on the body before the attachment of the first trim element on the upper branch of the body.

BRIEF DESCRIPTION OF THE DRAWINGS

Other aspects and advantages of the invention will appear upon reading the following description, provided as an example, and done in reference to the appended drawings, in which.

DETAILED DESCRIPTION

In the description, the terms "lower", "upper", "lateral", "front", "rear" are defined along the usual directions of an assembled vehicle, these terms referring, if applicable, to the position of the elements of the opening part when it is mounted and closed on the vehicle. The term "inner" refers to that which faces toward the body of the vehicle, and the term "outer" refers to that which faces toward the outside of the vehicle when the opening part is mounted on the vehicle.

Figure 1:
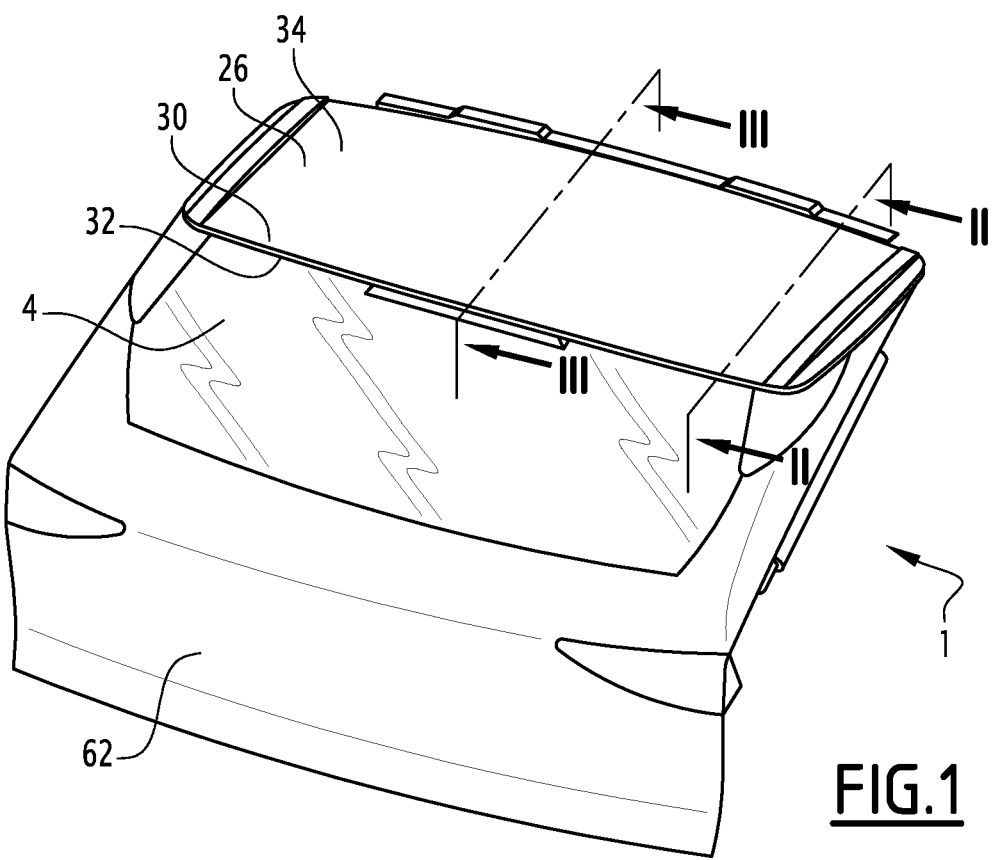
FIG. 1 is a schematic perspective illustration from the outside of a vehicle opening part according to the invention.

In reference to FIG. 1, a vehicle opening part 1 is described that is intended to close an opening of the body of the vehicle and to be movable relative to the body to free access to said opening in an open position of the opening part 1. The vehicle opening part 1 shown in the figures is a tailgate intended to close the access opening to the rear storage space, or trunk, of the vehicle. It is, however, understood that the invention could, according to other embodiments, apply to other opening parts of the vehicle.

Figure 5:
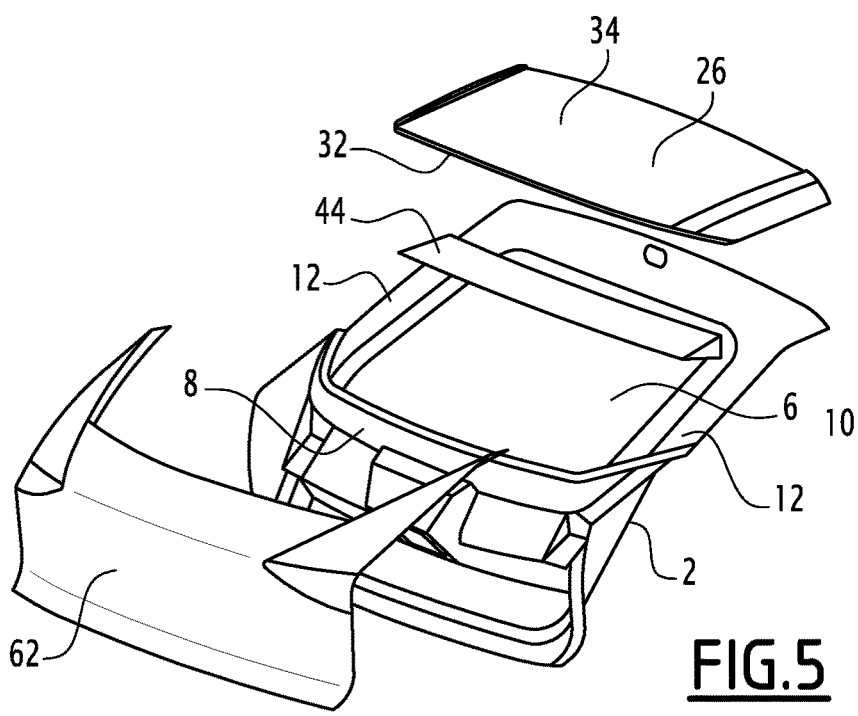
Figure 6:
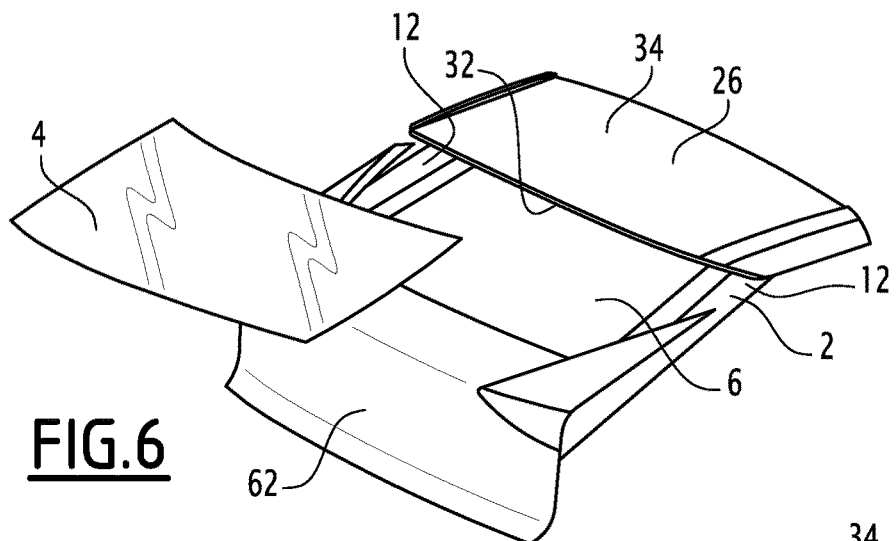

The opening part 1 comprises a main body 2, more particularly visible in FIGS. 5 and 6. The body 2 is for example made in a single plastic part. The body 2 may further comprise one or several metal reinforcements, for example overmolded by the plastic. The body 2 may also comprise reinforcing ribs. Thus, as is known in itself, the body 2 gives the opening part its stiffness properties and mechanical characteristics.

In a known manner, the body 2 is arranged to receive functional elements of the opening part, such as optical elements, one or several bundles of electric cables, a lock, etc.

The body 2 is also arranged to receive a window 4, for example forming the rear bezel in the case of a tailgate, making it possible to see through the opening part 1. To that end, the body 2 defines an opening 6 passing through the body 2 from the outside toward the inside. The body 2 forms a frame surrounding the opening 6 and in particular comprising an inner edge 8, an upper branch 10 and two lateral uprights 12 connecting the lower edge 8 to the upper branch 10 on either side of the opening 6.

Figure 2:
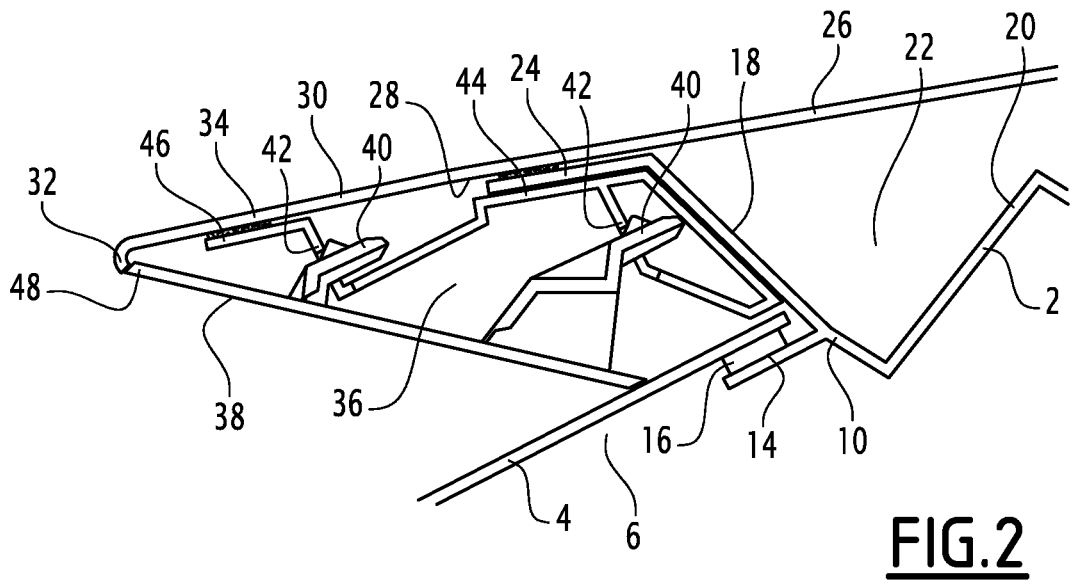
FIG. 2 is a schematic sectional illustration along axis II-II of FIG. 1.
Figure 3:
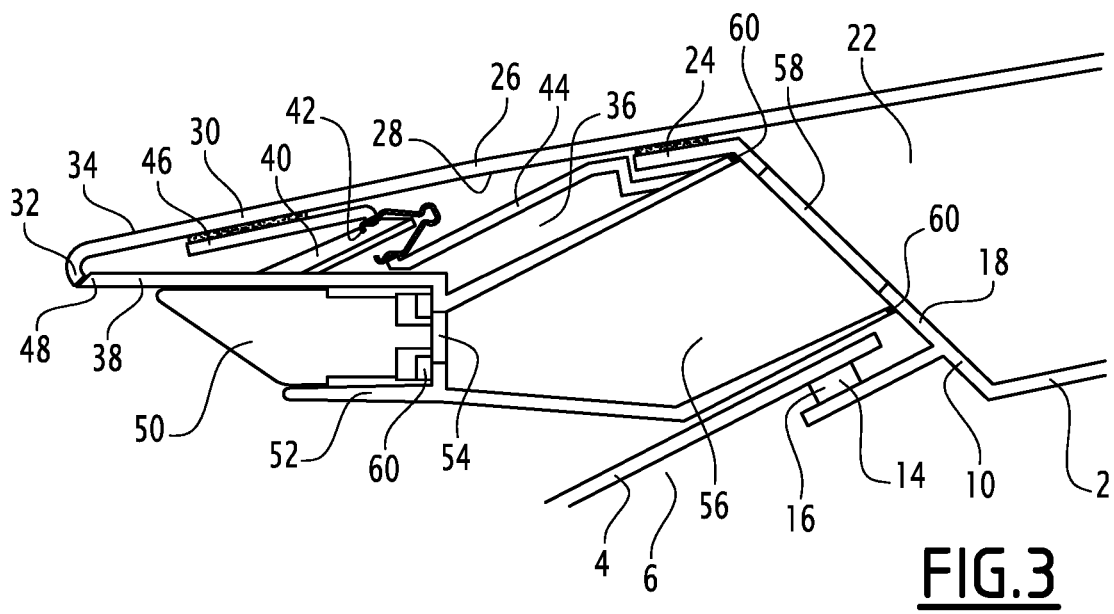
FIG. 3 is a schematic sectional illustration along axis III-III of FIG. 1, and FIGS. 4 to 7 are schematic perspective illustrations of the various assembly steps of the tailgate according to the invention.
Figure 7:
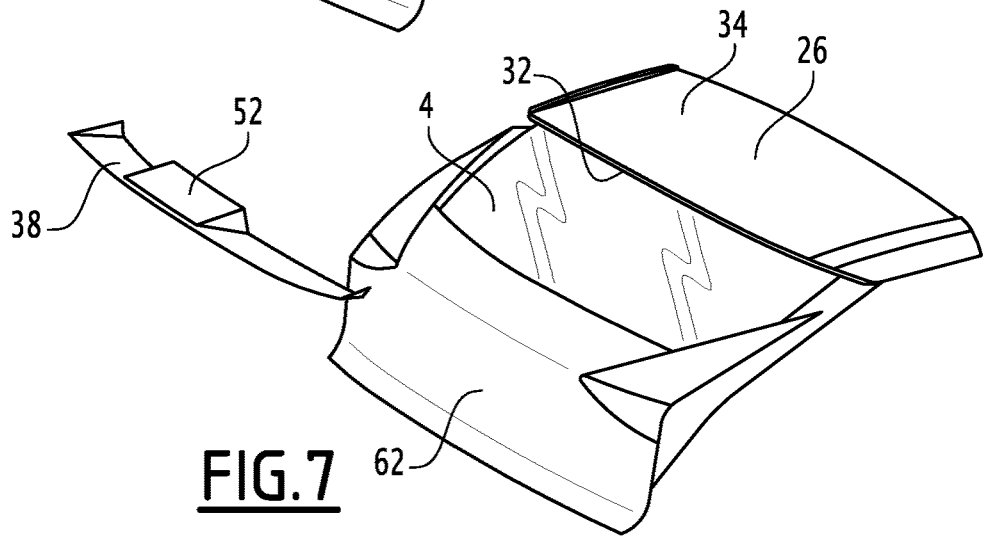

The window 4 is attached on the frame surrounding the opening 6 so as to close the opening, as shown in FIGS. 1 and 7. The window 4 is attached on the outer face of the body 2 so as to allow assembly from the outside, as will be described later. The attachment of the window on the upper branch 10 is done on an upper edge 14 of the upper branch extending along the opening 6 and forming a receiving surface for an upper edge of the window 4, as shown in FIGS. 2 and 3. The attachment of the window 4 on the upper edge 14, like on the other edges of the opening, is for example done by gluing, for example using a strip of glue 16, providing the fixing of the window 4 and the sealing between the window 4 and the frame.

Thus, as shown in FIGS. 2 and 3, the upper branch 10 further comprises a wall 18 projecting from the upper edge 14, defining, with an opposite wall 20, a cavity 22 open toward the outside of the body 2 along the elevation direction of the vehicle. The wall 18 comprises, at its free end opposite the upper edge 14, a recess 24 extending across from the upper edge 14 and forming a bearing and attachment surface.

The upper branch 10 is covered by a first trim element 26 fixed on the body 2 so as to close the cavity 22 sealably. The first trim element 26 is in particular arranged on and attached to the recess 24, for example by gluing of the inner face 28 of the first trim element 26 on the outer face of the recess 24. Thus, the recess 24 supports part of the trim element 26. The first trim element 26 further comprises a projecting part 30 projecting from the recess 24 across from the window 4. Thus, the projecting part 30 forms a protrusion extending across from the window 4 and spaced away therefrom, arranged to extend in the continuity of the roof of the vehicle when the opening part 1 is closed. At its free end, the projecting part 30 for example comprises a return arranged to form a pointed edge 32. In other words, the first trim element 26 is arranged to form the upper outer surface of the opening part 1 and is suitable for forming the upper part of a projecting spoiler across from the window 4. To that end, at least the outer face 34 of the first trim element 26, which forms the part of the first trim element that is visible from outside the vehicle, is for example painted to give it a pleasing appearance.

The projecting part 30 defines, with the upper edge 14 and the window 4, a functional space 36 extending between the outer face of the window 4 and the inner face 28 of the first trim element 26 as well as the inner face of the recess 24. Toward the inside, the functional space 36 is closed by the wall 18 extending in the upper edge 14 and the inner face 28 of the first trim element 26. Toward the outside, the functional space 36 is open, so as to leave access to the body 2 between the upper edge 14 and the inner face 28 of the first trim element 26 and to allow the mounting of the opening part 1, as will be described later.

When the opening part 1 is mounted, the functional space 36 is closed toward the outside by a second trim element 38 extending between the window 4 and the free end of the first trim element 26. The second trim element 38 thus forms the lower part of the spoiler. The second trim element 38 is attached to the body 2 by at least one fastening element 40 extending in the functional space 36, for example protruding from the inner face of the second trim element 38. The fastening element 40 is for example formed by a snapping element arranged to cooperate with a corresponding orifice 42 by clipping. According to the embodiment shown in the figures, the second trim element 38 is attached by several fastening elements 40 distributed along the second trim element 38. In all cases, the second trim element 38 is attached to the body exclusively by one or more fastening elements 40 extending exclusively in the functional space 36. In other words, the second trim element 38 is only attached to the body 2 by one or more fastening elements 40 passing in the functional space 36, i.e., through the outside of the opening part 1. It is therefore not necessary to have access to the inner side of the opening part 1 to attach the second trim element 38, as will be described later.

The attachment of the second trim element 38 on the body 2 is done, according to one embodiment, by an interface part 44 attached on the body 2 in the functional space 36. The interface part 44 comprises the orifice(s) 42 of the fastening element(s) 40 of the second trim element 38. Thus, it is not necessary to form the orifices 42 in the wall 18 of the upper branch 10, which makes it possible to preserve the sealing thereof. The interface part 44 is for example attached by gluing to the wall 18 and/or the inner face of the recess 24 or using sealed fastening elements, such as sealed rivets or the like. According to one embodiment and as shown in FIGS. 2 and 3, the interface part 44 further comprises a support branch 46 extending across from the projecting part 30 of the first trim element 26 such that the inner face 28 of the first trim element 26 can be arranged on the support branch 46, and for example attached thereon by gluing, in order to provide support for the projecting part 30 and to preserve the stiffness thereof.

Owing to the fixing of the second trim element 38 by the fastening elements 40 extending in the functional space 36, it is not necessary to attach the second trim element 38 directly to the first trim element 26. Thus, a free end 48 of the second trim element 38 can be simply placed against the free end of the first trim element 26, more particularly against the return formed at said free end, without being attached thereto. This flush contact between the two free ends makes it possible to refine the return formed at the free end of the first trim element 26 and thus to accentuate the tip formed by the edge 32 of the spoiler, as shown in FIGS. 2 and 3. This accentuation makes it possible to improve the aerodynamic performance of the spoiler as well as its appearance.

The first trim element 26 and the second trim element 38 being formed by separate parts, these trim elements 26 and 38 can have different appearances from one another. More particularly, the second trim element 38 does not need to be painted with the first trim element 26 and thus has a "raw" appearance, for example matte black, as is often desired for such trim.

Thus, the opening part 1 according to the invention has a particularly satisfactory appearance.

According to one embodiment, the second trim element 38 forms a support for an optical element 50, for example a brake light of the vehicle. To that end, the second trim element 38 comprises a housing 52 receiving the optical element 50, as shown in FIG. 3. The power supply of the optical element 50 is provided by at least one electric cable (not shown) connected to a current source, for example provided in the motor vehicle. To allow the passage of the cable, the bottom of the housing 52 comprises a passage orifice 54 emerging in a tunnel 56 formed by the second trim element 38. The tunnel 56 extends to the wall 18 of the upper branch 10 and frames an opening 58 formed in said wall 18, such that the electric cable can pass in the tunnel 56 and the opening 58 and thus pass toward the inside of the vehicle. The bearing of the tunnel against the wall 18 around the opening 58 is a sealed bearing so as to preserve the sealing of the cavity 22. Likewise, to preserve this sealing, the optical element 50 is placed in sealed bearing against the bottom of the housing 52 around the orifice 54. This sealing bearing is for example provided using seals 60.

The method for assembling the opening part 1 described above will now be described, in particular in reference to FIGS. 4 to 7.

Figure 4:
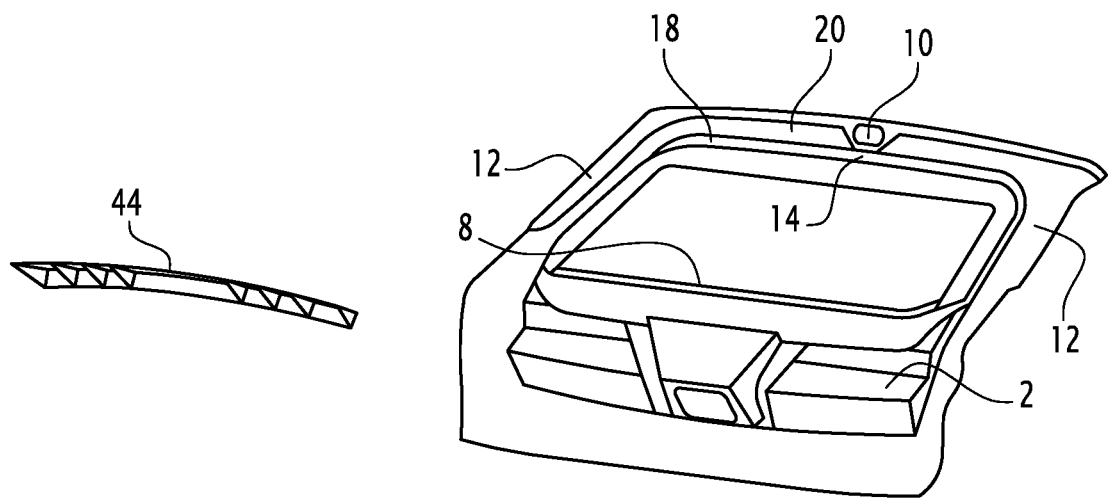

The main body 2 is for example made by injection molding, and as shown in FIGS. 4 and 5, the intermediate part 44 is, if applicable, attached on the upper branch 10 of the body 2, for example by gluing.

The outer surfaces of the opening part 1 are next assembled on the body 2, as shown in FIG. 5. These outer surfaces in particular comprise the first trim element 26 previously described and a liner skin 62 covering the lower part of the body 2 up to the lower edge 8 of the opening 6, as is known in itself.

The attachment of the first trim element 26 is for example done by gluing, on fastening surfaces extending on either side of the cavity 22, in particular on the recess 24, and on the support branch 46 of the interface part 44 when the latter is provided. At the end of this assembly, the cavity 22, and more generally the outer face of the body 2, are closed sealably. The upper part of the spoiler is thus integrated into the opening part 1 and does not form an attached part attached on the finished opening part 1.

A step, not shown, for assembling an inner liner on the inner face of the body 2 can also be provided.

The above assembly steps may for example be carried out at a motor vehicle equipment manufacturer in order to be delivered in one piece to a motor vehicle builder, who can then carry out the assembly steps that will now be described.

As shown in FIG. 6, the window 4 is next attached on the frame surrounding the opening, in particular on the upper edge 14, for example by gluing. This fixing is done from the outside of the body 2 by passing through the functional space 36 extending between the inner face of the projecting part 30 of the first trim element 26 and the upper edge 14. To that end, this functional space 36 is sized to allow the passage of the upper part of the window 4 toward the upper edge 14 without interference with the first trim element 26, which facilitates the mounting of the window 4.

Lastly, the second trim element 38 is mounted on the opening part 1 to close the functional space 36. As previously indicated, the fixing of the second trim element 38 is done only from outside the opening part, without requiring access to the inner side of the body 2, which greatly simplifies the mounting of the opening part 1 and improves the sealing of the opening part 1. The fixing operation of the second trim element 38 is done simply by pushing the second trim element 38 into the functional space 36 until the fastening element(s) 40 cooperate with the edges of the corresponding orifice(s) 42, which is a very simple and fast operation to perform. Only the lateral deflectors may require access from inside the vehicle. However, the mounting of said deflectors is done in a zone where sealing is not necessary on the sides of the opening part.

The invention claimed is:

1. A vehicle opening part, comprising a main body defining an opening closed by a window, attached on at least one upper edge of said opening, said upper edge being formed on an upper branch of said body, said upper branch further comprising a cavity open toward the outside of the body, the opening part further comprising a first trim element attached on the upper branch so as to hermetically close said cavity, the first trim element comprising a projecting part projecting from the upper branch across from the window, such that a functional space extends between said window and said projecting part, wherein the opening part further comprises a second trim element closing said functional space, said second trim element being attached to the body exclusively by at least one fastening element extending in the functional space between said first trim element and said window.

2. The vehicle opening part according to claim 1, wherein the second trim element is attached to the body via an interface part, attached to the body between the upper edge and the first trim element and extending in the functional space, said interface part comprising at least one orifice for receiving the fastening element of the second trim element.

3. The vehicle opening part according to claim 2, wherein the interface part comprises a support branch extending across from the projecting part of the first trim element, said projecting part being attached on said support branch.

4. The vehicle opening part according to claim 1, wherein the second trim element comprises a free end flush with a free end of the projecting part of the first trim element, said free ends forming a pointed edge extending across from the window.

5. The vehicle opening part according to claim 1, wherein at least one optical element is attached in a housing formed in the second trim element.

6. The vehicle opening part according to claim 5, wherein an orifice is formed in the bottom of the housing, said orifice being connected sealably to an opening emerging in the cavity of the body, to allow the connection of the optical element to a current source through the cavity of the body.

7. The vehicle opening part according to claim 1, wherein the first trim element is glued on the upper branch of the body.

8. The vehicle opening part according to claim 1, wherein the first trim element and the second trim element have a different appearance from one another.

9. A method for assembly a vehicle opening part, the vehicle opening part comprising a main body defining an opening closed by a window, attached on at least one upper edge of said opening, said upper edge being formed on an upper branch of said body, said upper branch further comprising a cavity open toward the outside of the body, the opening part further comprising a first trim element attached on the upper branch so as to hermetically close said cavity, the first trim element comprising a projecting part projecting from the upper branch across from the window, such that a functional space extends between said window and said projecting part, the opening part further comprising a second trim element closing said functional space, said second trim element being attached to the body exclusively by at least one fastening element extending in the functional space between said first trim element and said window, the method comprising the following successive steps:
attaching the first trim element on the upper branch of the body,
placing the window over the opening and attaching the window on the upper edge of the opening,
closing the functional space between the window and the projecting part of the first trim element using the second trim element, the attachment of said second trim element being done only in said functional space.

10. The assembly method according to claim 9 for an opening element, wherein the second trim element is attached to the body via an interface part, attached to the body between the upper edge and the first trim element and extending in the functional space, said interface part comprising at least one orifice for receiving the fastening element of the second trim element, wherein the interface part is attached on the body before the attachment of the first trim element on the upper branch of the body.

* * * * *